US012307154B1

(12) United States Patent
Norville et al.

(10) Patent No.: US 12,307,154 B1
(45) Date of Patent: May 20, 2025

(54) SYSTEM AND METHOD FOR PROTECTING A MULTI-PANEL INTERACTIVE VIDEO DISPLAY

(71) Applicant: PanoScape Holdings, LLC, Oakbrook Terrace, IL (US)

(72) Inventors: Alex Norville, Oakbrook Terrace, IL (US); Jeremiah Fitzgerald, Wheaton, IL (US)

(73) Assignee: PanoScape Holdings, LLC, Oakbrook Terrace, IL (US)

( * ) Notice: Subject to any disclaimer, the term of this patent is extended or adjusted under 35 U.S.C. 154(b) by 0 days.

(21) Appl. No.: 18/423,285

(22) Filed: Jan. 25, 2024

(51) Int. Cl.
*G06F 3/14* (2006.01)
*G06F 1/18* (2006.01)
*G06F 3/041* (2006.01)
*G06F 3/042* (2006.01)

(52) U.S. Cl.
CPC ............ *G06F 3/1446* (2013.01); *G06F 1/181* (2013.01); *G06F 3/0412* (2013.01); *G06F 3/0421* (2013.01)

(58) Field of Classification Search
CPC ...... G06F 3/1446; G06F 1/181; G06F 3/0412; G06F 3/0421
See application file for complete search history.

(56) References Cited

U.S. PATENT DOCUMENTS

| | | | | |
|---|---|---|---|---|
| 5,476,314 A | * | 12/1995 | Nishiki | A47B 81/06 312/10.1 |
| 6,550,521 B1 | * | 4/2003 | McNabb | H05K 5/0204 359/457 |
| 9,148,614 B2 | * | 9/2015 | Szolyga | H04N 5/64 |
| 9,372,659 B2 | * | 6/2016 | Hall | H05K 7/2039 |
| 10,061,553 B2 | * | 8/2018 | Hall | G06F 3/1446 |
| 10,372,402 B1 | * | 8/2019 | Fitzgerald | G06F 3/1446 |
| 10,706,770 B2 | * | 7/2020 | Hall | G06F 3/1446 |
| 2002/0003592 A1 | * | 1/2002 | Hett | G09F 9/35 349/58 |
| 2002/0186956 A1 | * | 12/2002 | Lowry | G09F 9/305 385/147 |
| 2006/0114245 A1 | * | 6/2006 | Masters | G06F 3/0421 345/175 |
| 2006/0262144 A1 | * | 11/2006 | Harris | G06T 3/4038 345/660 |
| 2009/0225506 A1 | * | 9/2009 | Lee | H05K 5/0021 29/469 |
| 2010/0123052 A1 | * | 5/2010 | Cheng | G09F 7/18 248/121 |
| 2010/0258696 A1 | * | 10/2010 | Cheng | F16M 11/046 248/295.11 |

(Continued)

*Primary Examiner* — Dmitriy Bolotin
(74) *Attorney, Agent, or Firm* — Kaspar Law Company, LLC; Scott R. Kaspar

(57) ABSTRACT

A system and method for protecting a multi-panel interactive video display is disclosed having a frame having a plurality of vertical and horizontal members to generally define a rectilinear structure; a plurality of interactive video displays operatively connected to the vertical members of the frame; one or more protective panels positioned in front of the interactive video displays; an infrared sensing frame circumnavigating and positioned adjacent to and in front of the one or more protective panels; and an external frame circumnavigating and positioned adjacent to and in front of the infrared sensing frame.

18 Claims, 5 Drawing Sheets

(56) References Cited

U.S. PATENT DOCUMENTS

| | | | | |
|---|---|---|---|---|
| 2011/0032215 A1* | 2/2011 | Sirotich | ............... | G06F 3/0425 |
| | | | | 361/679.01 |
| 2012/0251072 A1* | 10/2012 | Cope | ................... | G09F 9/3026 |
| | | | | 386/230 |
| 2013/0135206 A1* | 5/2013 | Bolt | .................. | G06F 3/03545 |
| | | | | 345/163 |
| 2013/0148324 A1* | 6/2013 | Szolyga | ................ | G06F 3/041 |
| | | | | 29/466 |
| 2013/0188327 A1* | 7/2013 | Lee | .................... | G09F 9/3026 |
| | | | | 361/807 |
| 2016/0378419 A1* | 12/2016 | Abraham | .......... | G06Q 30/0625 |
| | | | | 345/1.3 |
| 2018/0357033 A1* | 12/2018 | Welch | .................. | H04N 5/272 |
| 2019/0108784 A1* | 4/2019 | Foster | .................... | H05K 5/03 |
| 2020/0043388 A1* | 2/2020 | Hicks | .................. | G09F 19/227 |
| 2020/0225903 A1* | 7/2020 | Cohen | ................... | G09G 5/12 |
| 2020/0293260 A1* | 9/2020 | Fitzgerald | ............ | G06F 1/1605 |
| 2021/0200499 A1* | 7/2021 | Fitzgerald | ............ | G06F 3/1446 |
| 2021/0365082 A1* | 11/2021 | Jeong | ................. | G06F 3/1446 |
| 2022/0084481 A1* | 3/2022 | Manepalli | ............ | G09G 5/001 |
| 2022/0164155 A1* | 5/2022 | Fitzgerald | ............ | G06F 1/1605 |
| 2022/0164156 A1* | 5/2022 | Fitzgerald | ............ | H04N 23/698 |

* cited by examiner

SYSTEM AND METHOD FOR PROTECTING A MULTI-PANEL INTERACTIVE VIDEO DISPLAY

TECHNICAL FIELD

The present invention relates to interactive video displays, and more particularly, a system and method for protecting a multi-panel interactive video display.

BACKGROUND

There exists in the art multi-panel interactive video displays, including panoramic video walls, that are comprised of a plurality of display panels. The display panels work together to display one video instance that extends across the screens to create a video wall or panoramic effect.

Many of the conventional video walls are comprised of touch-screen video displays, which are configured to interact with a person through capacitive means when the person touches the screen, such as with a human finger. In this manner, a person can interact with the touch-screen video wall by touching an area of the displays, which often times triggers a dialogue box or separate window to launch.

A disadvantage of touch-screen video displays is that repeated contact may inflict wear-and-tear on the displays that deteriorates the front surface of the display and potentially may degrade the touch-screen capabilities and/or resolution of the displayed video content. Additionally, oils and contaminants from a human finger transfers to the front surface of the display, which through prolonged exposure also may impact the display's touch-screen capabilities and/or resolution.

One solution known in the art is to bond a protective sheeting over the front surface of the touch-screen video display, to protect the front surface of the display from the wear-and-tear and other potentially degrading effects of repeated contact from a human finger. For example, U.S. Pat. No. 9,671,824 to Mundrake ("Mundrake") discloses the use of a transparent protective sheeting that is bonded to the front surface of the display.

While prior art solutions may address the wear-and-tear and potential degradation to video displays, they are time consuming and expensive solutions to implement, and if cracked or fractured, often require total replacement at great cost.

SUMMARY OF THE INVENTION

According to one non-limiting aspect of the present disclosure, an example embodiment of a system for protecting a multi-panel interactive video display is disclosed. The exemplar system includes a frame having a plurality of vertical and horizontal members to generally define a rectilinear structure; a plurality of interactive video displays operatively connected to the vertical members of the frame; one or more protective panels positioned in front of the interactive video displays; an infrared sensing frame circumnavigating and positioned adjacent to and in front of the one or more protective panels; and an external frame circumnavigating and positioned adjacent to and in front of the infrared sensing frame.

According to another non-limiting aspect of the present disclosure, an example embodiment of a method for protecting a multi-panel interactive video display is disclosed. The method includes the steps of providing a frame having a plurality of vertical and horizontal members to generally define a rectilinear structure; providing a plurality of interactive video displays operatively connected to the vertical members of the frame; providing one or more protective panels positioned in front of the interactive video displays; providing an infrared sensing frame circumnavigating and positioned adjacent to and in front of the one or more protective panels; and providing an external frame circumnavigating and positioned adjacent to and in front of the infrared sensing frame.

Additional features and advantages of the system and method for protecting a multi-panel interactive video display described herein, and will be apparent from the following Detailed Description and the figures.

BRIEF DESCRIPTION OF THE DRAWINGS

Features and advantages of the system and method for protecting a multi-panel interactive video display described herein may be better understood by reference to the accompanying drawings in which.

The reader will appreciate the foregoing details, as well as others, upon considering the following Detailed Description of certain non-limiting embodiments of the system and method for protecting a multi-panel interactive video display in accordance with the present disclosure. The reader may also comprehend certain of such additional details upon using the system and method for protecting a multi-panel interactive video display described herein.

DETAILED DESCRIPTION

The present disclosure is directed, in part, to a system and method for protecting a multi-panel interactive video display.

Figure 1:
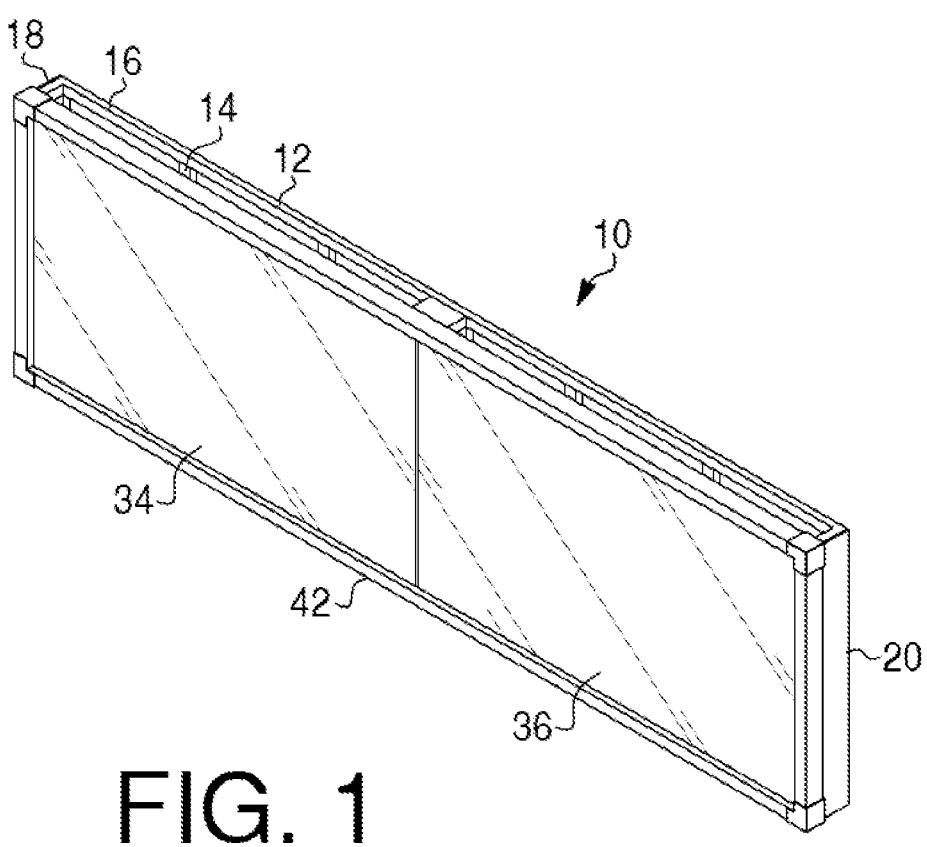
FIG. 1 depicts a perspective view of an exemplar embodiment of a system for protecting a multi-panel interactive video display that is configured for use on or with a fixed or stationary wall or surface.

As shown in FIG. 1, an exemplar embodiment of a system for protecting a multi-panel interactive video display or shroud (10) is shown. The exemplar embodiment of the system for protecting a multi-panel interactive video display or shroud (10) is configured for use on or with a fixed or stationary wall or surface.

The shroud (10) has a backing or internal frame (12). The frame (12) serves two purposes: first, the frame affixes, mounts, or attaches the shroud (12) to a wall or fixed vertical surface; second, the frame (12) supports the interactive video displays and houses the electronic components and cabling necessary to power and deliver video content to the interactive video displays.

A plurality of interactive video displays (30, 32) are mounted onto the frame (12) of the shroud (10). As shown in FIG. 1, the interactive video displays are positioned in a so-called landscape configuration; that is, the longest dimension of each such interactive video display is positioned to travel in a horizontal direction.

Interactive video displays (30, 32) may include off-the-shelf video displays using light-emitting diodes (LEDs), such as those commonly manufactured and sold by electronics companies such as Samsung® or LG®, as examples. Alternatively, interactive video displays (30, 32) may be display tiles or modules, such as, for instance, an LED tile or LED module.

Protective panels (34, 36) are positioned adjacent to and in front of interactive video displays (30, 32). Protective panels (34, 36) are configured to protect the surface or glass of the interactive video displays (30, 32), particularly from the wear-and-tear associated with fingers touching the displays and oils and other contaminants originating from the fingers that adheres to the display surfaces during interaction with the displays.

Protective panels (34, 36) are composed of a transparent material such as glass, acrylic, PlexiGlass®, or another composite, as necessary to protect the video displays (30, 32), while also balancing factors such as weight. Materials such as acrylic tend to be lighter weight than, for instance, glass, and also may be cut in larger sheets, which may be beneficial.

An infrared ("IR") frame (38) circumnavigates the displays (30, 32) and is positioned over and in front of the protective panels (34, 36). The IR frame (38) has an interior groove (40) on an inside edge of the IR frame for receiving the IR sensors, which detect presence of fingers interacting with the video displays (30, 32) and determine the location of the fingers and any contact of the fingers with the protective panels (34, 36).

An external frame (42) circumnavigates the IR frame (38) to cover the IR frame and to mount to the frame (12), thereby sandwiching the protective panels (34, 36) and interactive video displays (30, 32) with the frame (12).

Figure 2:
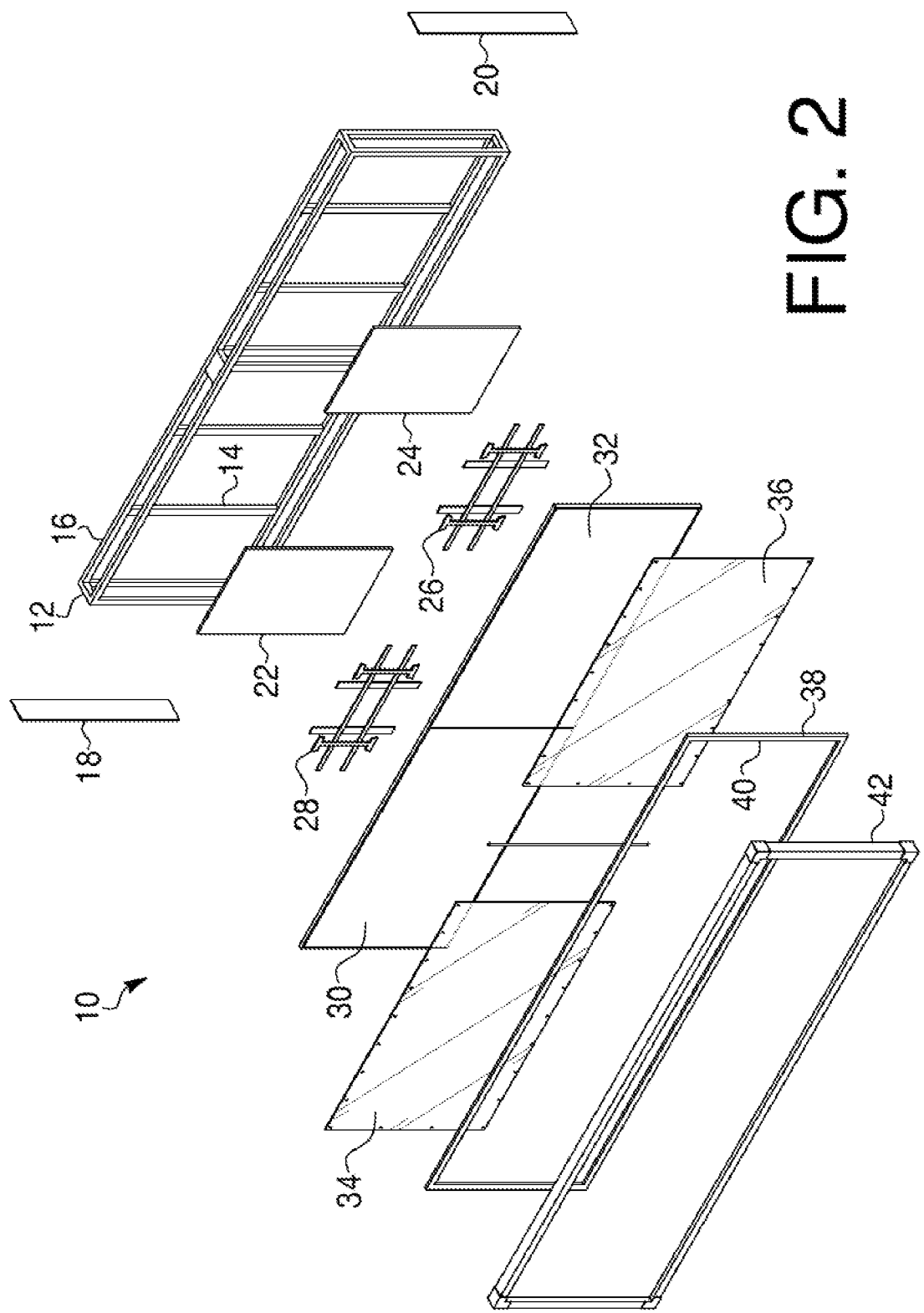
FIG. 2 depicts the exemplar embodiment of a system for protecting a multi-panel interactive video display of FIG. 1, as shown in a so-called exploded view, or a view in which the individual major components of the exemplar embodiment of the system for protecting a multi-panel interactive video display are deconstructed.

As shown in FIG. 2, the exemplar embodiment of a system for protecting a multi-panel interactive video display or shroud (10) of FIG. 1 is shown in a so-called exploded view, or a view in which the individual major components of the exemplar embodiment of the system for protecting a multi-panel interactive video display are deconstructed.

The shroud (10) has a backing or internal frame (12). The frame (12) serves two purposes: first, the frame affixes, mounts, or attaches the shroud (12) to a wall or fixed vertical surface; second, the frame (12) supports the interactive video displays and houses the electronic components and cabling necessary to power and deliver video content to the interactive video displays.

The frame (12) has a plurality of vertical bars (14) interconnected by and with a plurality of horizontal bars (16), as needed to generally form a rectilinear framing that mounts to a wall or fixed vertical surface while, at the same time, holding electronic equipment and cabling and the interactive video displays, as described and shown herein.

The frame (12) is made of a durable material, though is lightweight so as not to place too much of a load on the support wall or surface. For example, the frame (12) and its components, namely, the vertical (14) and horizontal (16) bars, are made of aluminum or other lightweight metal, such as off-the-shelf aluminum channel bars for constructing shelving, racks, and other structures. Alternatively, the frame (12) and its components, namely, the vertical (14) and horizontal (16) bars may be made of a composite or polymer material having a requisite strength for supporting the electronics mounted therein and thereon.

The frame (12) has end caps (18, 20) for concealing the depth of the frame and its internal contents. End caps (18, 20) may be composed of any opaque, lightweight material, such as, for example, aluminum or lightweight metal sheeting or plating. Alternatively, end caps (18, 20) may be composed of wood, plastic, or other composite material.

Attached to the frame (12) and potentially to the vertical wall or mounting surface are reinforcement boards (22, 24) for mounting the display mounts (26, 28). The reinforcement boards provide stability and rigidity for mounting the display mounts and are comprised of a material such as plywood or other wood.

Display mounts (26, 28) mount to the reinforcement boards (22, 24) and secure and hold the interactive video displays (30, 32). The display mounts (26, 28) may be off-the-shelf components, such as, for instance, a Peerless® brand display mount.

A plurality of interactive video displays (30, 32) are mounted onto the frame (12) of the shroud (10). As shown in FIG. 2, the interactive video displays are positioned in a landscape configuration; that is, the longest dimension of each such interactive video display is positioned to travel in a horizontal direction.

Interactive video displays (30, 32) may include off-the-shelf video displays using light-emitting diodes (LEDs), such as those commonly manufactured and sold by electronics companies such as Samsung® or LG®, as examples. Alternatively, interactive video displays (30, 32) may be display tiles or modules, such as, for instance, an LED tile or LED module.

Protective panels (34, 36) are positioned adjacent to and in front of interactive video displays (30, 32). Protective panels (34, 36) are configured to protect the surface or glass of the interactive video displays (30, 32), particularly from the wear-and-tear associated with fingers touching the displays and oils and other contaminants originating from the fingers that adheres to the display surfaces during interaction with the displays.

Protective panels (34, 36) are composed of a transparent material such as glass, acrylic, PlexiGlass®, or another composite, as necessary to protect the video displays (30, 32), while also balancing factors such as weight. Materials such as acrylic tend to be lighter weight than, for instance, glass, and also may be cut in larger sheets, which may be beneficial.

An infrared ("IR") frame (38) circumnavigates the displays (30, 32) and is positioned over and in front of the protective panels (34, 36). The IR frame (38) has an interior groove (40) on an inside edge of the IR frame for receiving the IR sensors, which detect presence of fingers interacting with the video displays (30, 32) and determine the location of the fingers and any contact of the fingers with the protective panels (34, 36).

The IR frame (38) provides another advantage. Because it is the IR frame (38) that detects the presence and positioning of fingers interacting with the video displays, and not through touch of the fingers on the displays—that is, while the video displays may have touchscreen or capacitance capabilities, such capabilities are not being utilized by the video displays for controlling content—the IR frame (38) may be positioned adjacent to and in contact with the protective panels (34, 36) and/or the video displays (30, 32) or, alternatively, the IR frame (38) may be positioned at a distance from the displays, such as, for instance, one inch or six inches in front of the video displays. The benefit of this spacing is that it allows heat generated by operation of the video displays to dissipate faster.

An external frame (42) circumnavigates the IR frame (38) to cover the IR frame and to mount to the frame (12), thereby sandwiching the protective panels (34, 36) and interactive video displays (30, 32) with the frame (12).

Figure 3:
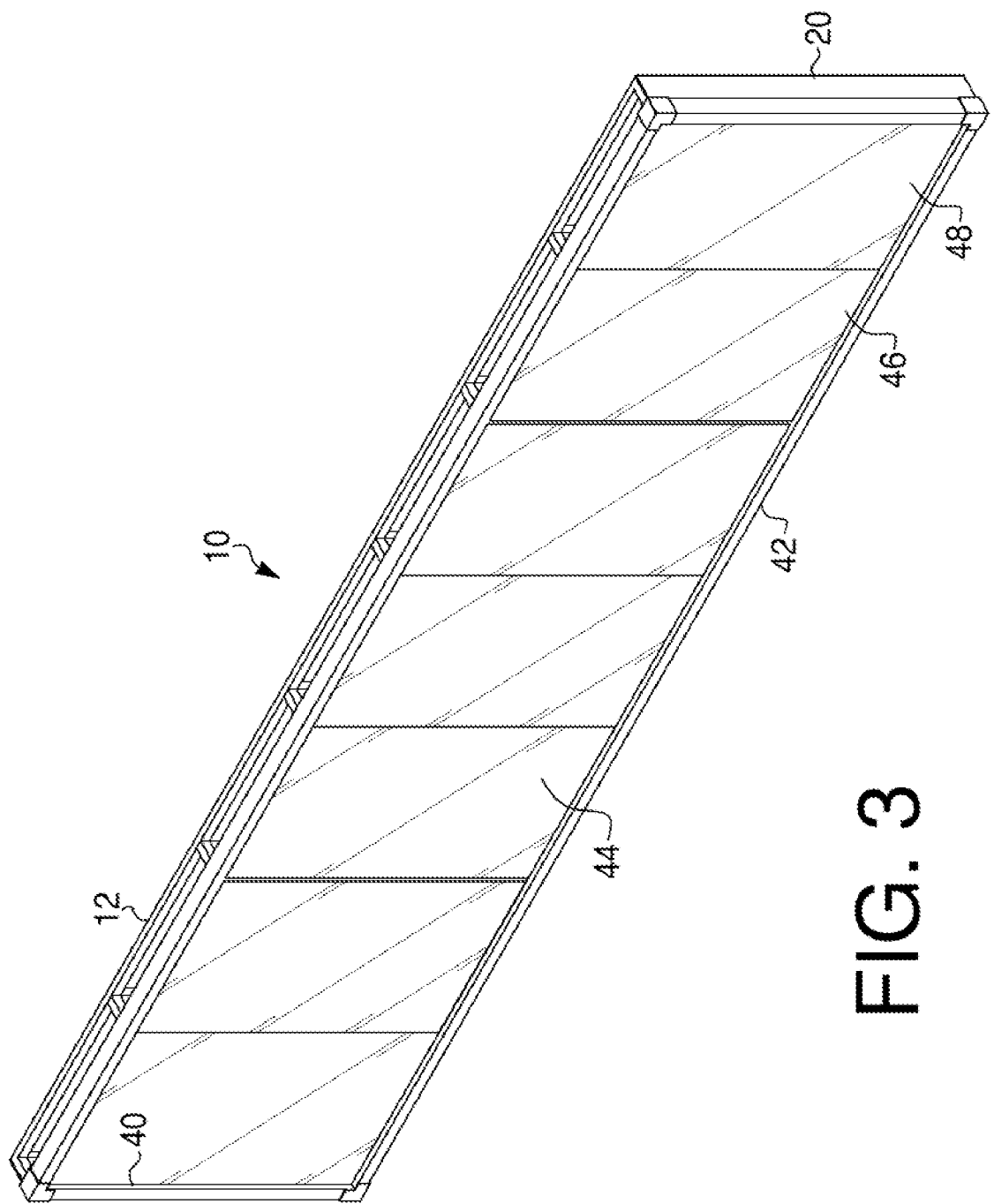
FIG. 3 depicts a perspective view of the exemplar embodiment of a system for protecting a multi-panel interactive video display of FIG. 1 in which a plurality of interactive video displays are positioned in an alternative orientation or configuration.

As shown in FIG. 3, a perspective view of the exemplar embodiment of a system for protecting a multi-panel interactive video display or shroud (10) of FIG. 1 is shown in which a plurality of interactive video displays are positioned in an alternative orientation or configuration.

For example, displays (46, 48) are positioned at a ninety-degree angle as compared to the displays (30, 32) shown in FIG. 1. In other words, the displays (46, 48) are positioned in a so-called profile configuration, as opposed to the landscape configuration of displays (30, 32) shown in FIG. 1.

Positioned adjacent to and over displays (46, 48) are protective panels (44).

The protective panels (44) and displays (46, 48) are encased by external frame (42).

Protective panels (44) are composed of a transparent material such as glass, acrylic, PlexiGlass®, or another composite, as necessary to protect the video displays (46, 48), while also balancing factors such as weight. Materials such as acrylic tend to be lighter weight than, for instance, glass, and also may be cut in larger sheets, which may be beneficial.

The use and/or operation of the exemplar embodiment of the system for protecting a multi-panel interactive video display or shroud (10) shown in FIGS. 1-3 is described as follows.

The frame (12) is mounted or affixed to a wall or other fixed, vertical surface. The displays (30, 32) are mounted or affixed to the frame (12) via display mounts (26, 28), and the external frame (42) sandwiches the protective panels (34, 36) and the IR frame (38) together with or against the video displays.

An advantage of the shroud (10) is that the external frame (42) readily detaches and removes from the frame (12) to allow quick access to the underlying components; namely, the IR frame (38), the protective panels (34, 36), and the video displays (30, 32). In this manner, electronic equipment can be readily accessed for maintenance, repairs, and/or replacement.

Shroud (10) provides a benefit over the prior art in that the protective panels (30, 32) are easily removable and replaceable, unlike conventional options, in which the protection is bonded directly to the glass or front surface of the video displays.

Figure 4:
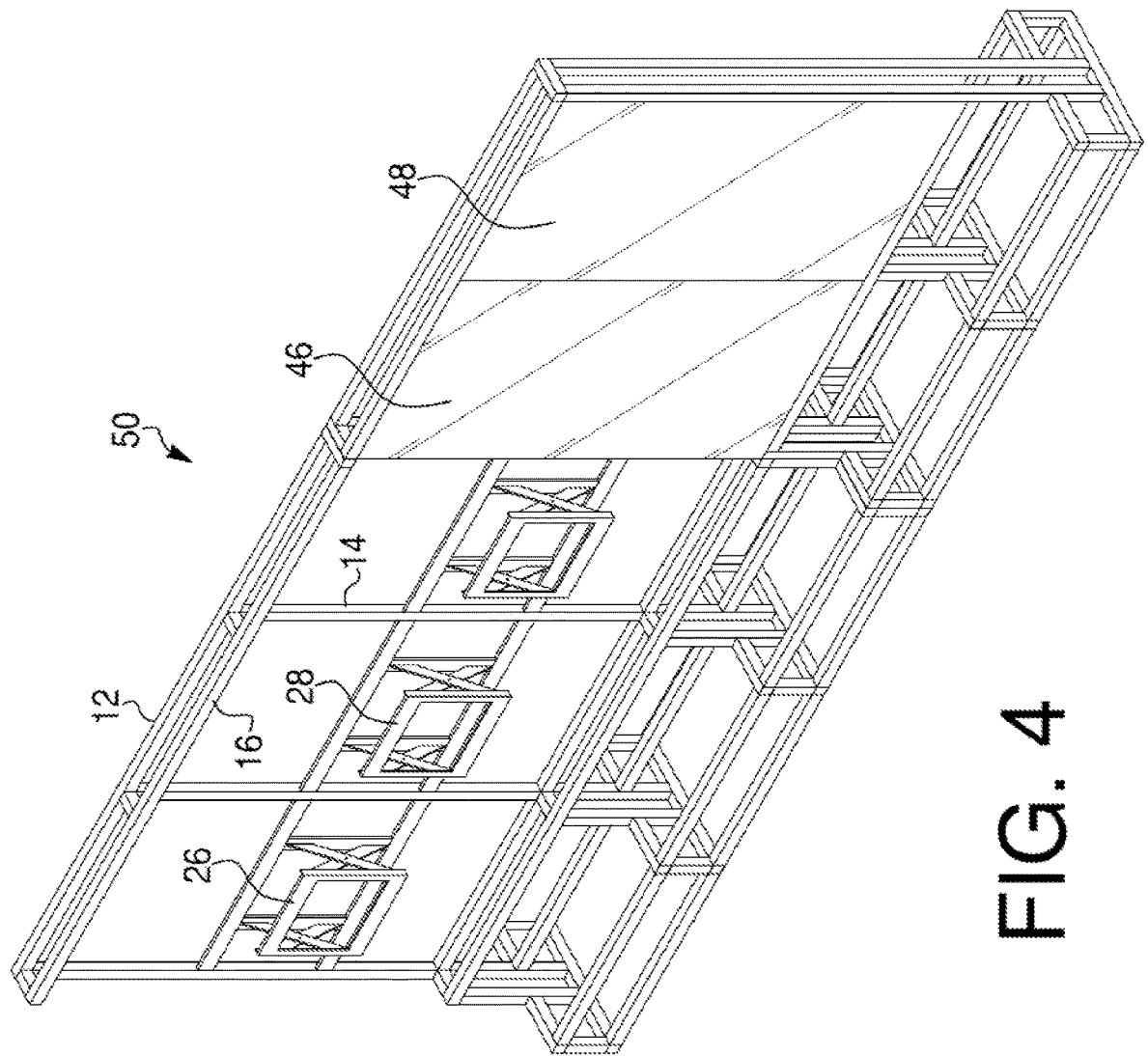
FIG. 4 depicts another exemplar embodiment of a system for protecting a multi-panel interactive video display, as shown in a partial exploded view, or a view in which many of the individual major components of the exemplar embodiment of the system for protecting a multi-panel interactive video display are deconstructed, that is configured for use on or with a moveable or mobile wall.

As shown in FIG. 4, another exemplar embodiment of a system for protecting a multi-panel interactive video display or shroud (50) is shown in a partial exploded view, or a view in which many of the individual major components of the exemplar embodiment of the system for protecting a multi-panel interactive video display are deconstructed.

The exemplar embodiment of the system for protecting a multi-panel interactive video display or shroud (50) shown in FIG. 4 is configured for use on or with a moveable or mobile wall.

Figure 5:
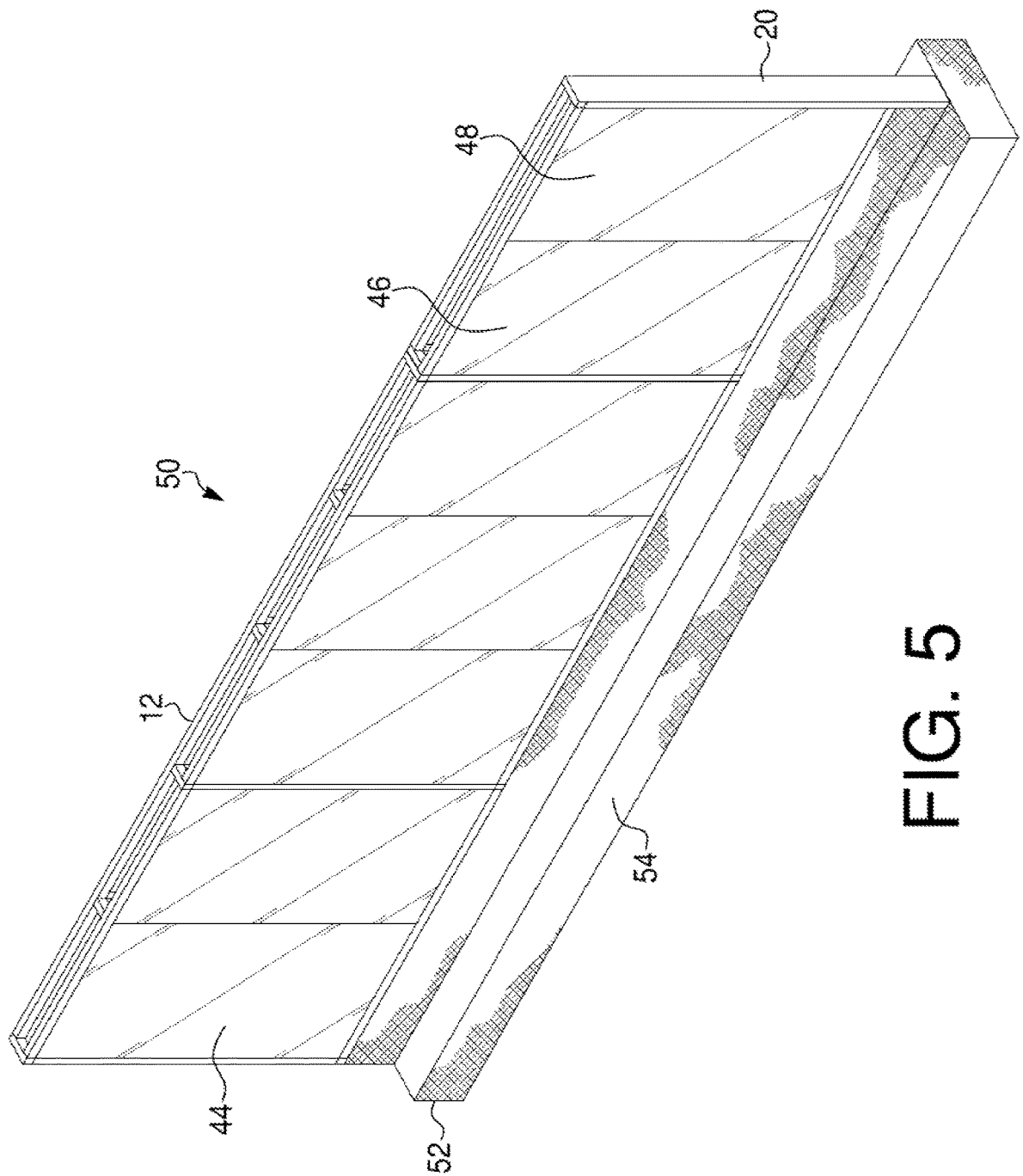
FIG. 5 depicts a perspective view of the exemplar embodiment of a system for protecting a multi-panel interactive video display of FIG. 4.

The shroud (50) includes a modified frame (12) having vertical (14) and horizontal (16) bars supported by a base (52, as shown in FIG. 5), all of which are made of the same material, such as, for instance, aluminum channel bars. In this embodiment, by the provision of a base (52, as shown in FIG. 5), the shroud (50) becomes free standing.

Displays (46, 48) are attached to or mounted on the frame (12) via display mounts (26, 28). The display mounts (26, 28) may be off-the-shelf components, such as, for instance, a Peerless® brand display mount.

As shown in FIG. 4, the displays (46, 48) are shown as being positioned in a profile orientation or configuration. Just as with the embodiment of shroud (10) shown in FIG. 2, the displays also may be positioned in a landscape orientation or configuration.

Display mounts (26, 28) are attached or affixed to the frame (12) via bracketing that attaches or affixes to vertical bars (14) of the frame (12).

As shown in FIG. 5, a perspective view of the exemplar embodiment of a system for protecting a multi-panel interactive video display or shroud (50) of FIG. 4 is shown.

The interactive video displays (46, 48) are protected by a protective panel (44). Protective panels (44) are composed of a transparent material such as glass, acrylic, PlexiGlass®, or another composite, as necessary to protect the video displays (46, 48), while also balancing factors such as weight. Materials such as acrylic tend to be lighter weight than, for instance, glass, and also may be cut in larger sheets, which may be beneficial.

The base (52) of frame (12) flairs outwardly for greater stability to prevent the frame (12) from tipping over.

The base (52) has a covering (54) that covers the frame (12) to enclose and hide the electronics and cabling secured within the frame (12). The covering (54) may be any opaque, lightweight material, such as, for example, aluminum or lightweight metal sheeting or plating. Alternatively, covering (54) may be composed of wood, plastic, or other composite material.

The use and/or operation of the exemplar embodiment of the system for protecting a multi-panel interactive video display or shroud (50) shown in FIGS. 4-5 is described as follows.

The frame (12) is readily moveable and freely stands on its own weight. The displays (46, 48) are mounted or affixed to the frame (12) via display mounts (26, 28), and the external frame (42) sandwiches the protective panels (44) and the IR frame (38) together with or against the video displays.

An advantage of the shroud (50) is that the external frame (42) readily detaches and removes from the frame (12) to allow quick access to the underlying components; namely, the IR frame (38), the protective panels (44), and the video displays (46, 48). In this manner, electronic equipment can be readily accessed for maintenance, repairs, and/or replacement.

Shroud (50) provides a benefit over the prior art in that the protective panels (44) are easily removable and replaceable, unlike conventional options, in which the protection is bonded directly to the glass or front surface of the video displays.

It should be understood that various changes and modifications to the presently preferred embodiments of the system and method for protecting a multi-panel interactive video display described herein will be apparent to those skilled in the art. Such changes and modifications can be made without departing from the spirit and scope of the system and method for protecting a multi-panel interactive video display described herein without diminishing any intended advantages. It is therefore intended that such changes and modifications be covered by the appended set of claims.

What is claimed is:

1. A system for protecting a multi-panel interactive video display comprising:
   a frame having a plurality of vertical and horizontal members to generally define a rectangular prism having a front face opposite a back face, the front and back faces spaced apart by a pair of end caps;
   a plurality of display mounts positioned inside of the frame, each of said plurality of display mounts attached to a vertical member defining the rear face of the frame;
   a plurality of interactive video displays operatively connected to the plurality of display mounts;
   one or more protective panels positioned in front of the interactive video displays, the one or more protective panels positioned against the horizontal and vertical members defining the front face of the frame;
   an infrared sensing frame circumnavigating the front face of the frame and positioned adjacent to and in front of the one or more protective panels to retain the one of more protective panels against the horizontal and vertical members defining the front face of the frame; and
   an external frame circumnavigating and positioned over the infrared sensing frame, the external frame having a left side opposite a right side, the left and right sides of the frame being in contact with the pair of end caps of the frame when the external frame is positioned over the infrared sensing frame.

2. The system of claim 1 wherein the frame is a freestanding structure.

3. The system of claim 2 further comprising a set of end caps affixed to opposite sides of the frame for concealing the interior of the frame.

4. The system of claim 2 wherein the plurality of interactive video displays are positioned in a landscape orientation.

5. The system of claim 2 wherein the plurality of interactive video displays are positioned in a profile orientation.

6. The system of claim 2 wherein the one of more protective panel comprises a single protective panel that spans the entire width of the plurality of interactive video displays.

7. The system of claim 2 wherein the one or more protective panel comprises two protective panels adjoined that collectively span the entire width of the plurality of interactive video displays.

8. The system of claim 1 wherein the frame is affixed to a fixed, vertical surface.

9. The system of claim 8 wherein the plurality of interactive video displays are positioned in a landscape orientation.

10. The system of claim 8 wherein the plurality of interactive video displays are positioned in a profile orientation.

11. The system of claim 8 wherein the one of more protective panel comprises a single protective panel that spans the entire width of the plurality of interactive video displays.

12. The system of claim 8 wherein the one or more protective panel comprises two protective panels adjoined that collectively span the entire width of the plurality of interactive video displays.

13. A method for protecting a multi-panel interactive video display comprising the steps of:
   providing a frame having a plurality of vertical and horizontal members to generally define a rectangular prism having a front face opposite a back face, the front and back faces spaced apart by a pair of end caps;
   providing a plurality of display mounts positioned inside of the frame, each of said plurality of display mounts attached to a vertical member defining the rear face of the frame;
   providing a plurality of interactive video displays operatively connected to the plurality of display mounts;
   providing one or more protective panels positioned in front of the interactive video displays, the one or more protective panels positioned against the horizontal and vertical members defining the front face of the frame;
   providing an infrared sensing frame circumnavigating the front face of the frame and positioned adjacent to and in front of the one or more protective panels to retain the one of more protective panels against the horizontal and vertical members defining the front face of the frame; and
   providing an external frame circumnavigating and positioned over the infrared sensing frame, the external frame having a left side opposite a right side, the left and right sides of the frame being in contact with the pair of end caps of the frame when the external frame is positioned over the infrared sensing frame.

14. The method of claim 13 wherein the frame is a freestanding structure.

15. The method of claim 13 wherein the plurality of interactive video displays are positioned in a landscape orientation.

16. The method of claim 13 wherein the plurality of interactive video displays are positioned in a profile orientation.

17. The method of claim 13 wherein the one of more protective panel comprises a single protective panel that spans the entire width of the plurality of interactive video displays.

18. The method of claim 13 wherein the one or more protective panel comprises two protective panels adjoined that collectively span the entire width of the plurality of interactive video displays.

* * * * *